Figure 1:
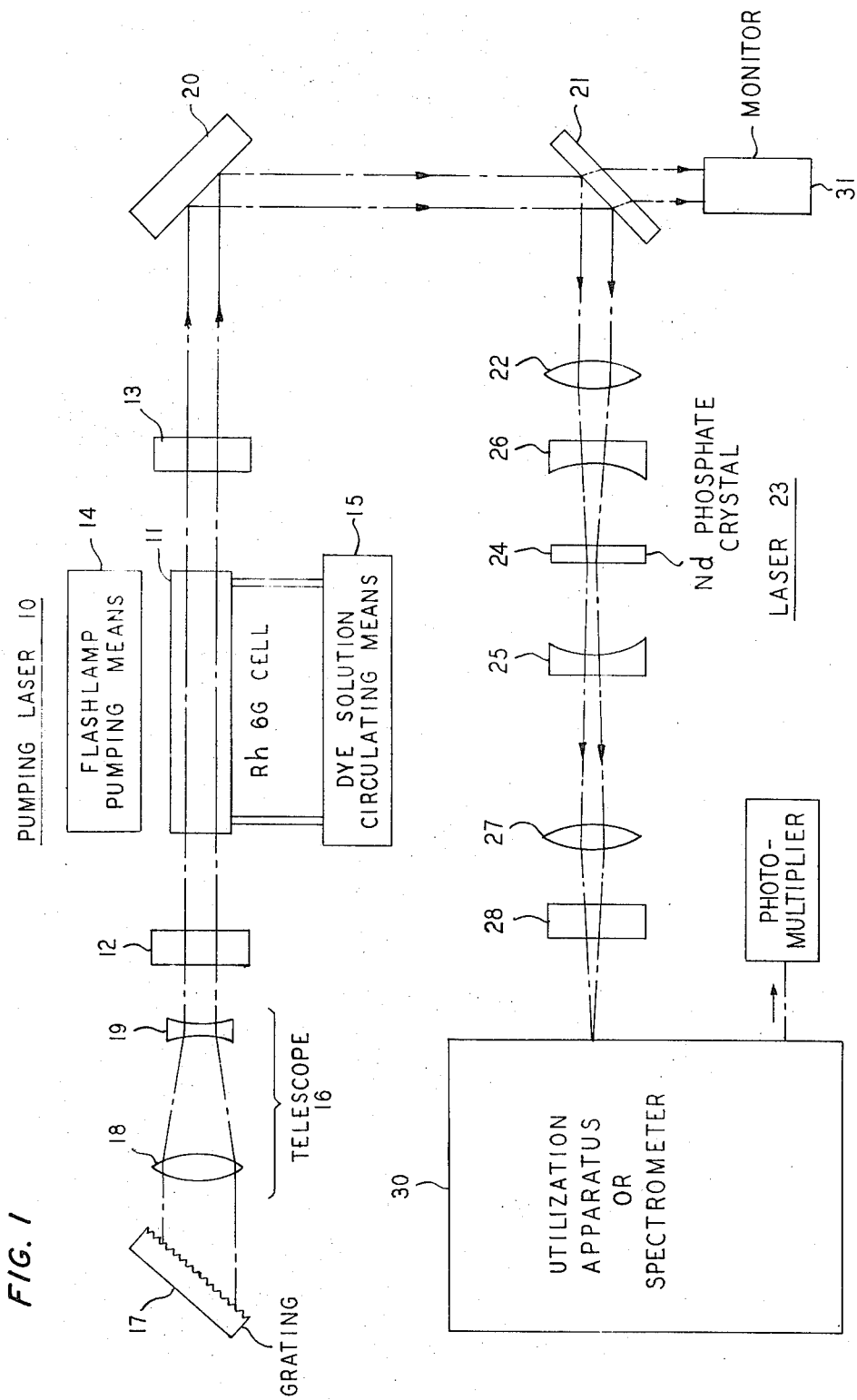

United States Patent [19]
Danielmeyer et al.

[11] 3,813,613
[45] May 28, 1974

[54] LASER EMPLOYING A METALLIC PENTAPHOSPHATE

[75] Inventors: Hans Güenter Danielmeyer, Baden-Wurttemberg, Germany; Heinz Paul Weber, Middletown, N.J.

[73] Assignee: Bell Telephone Laboratories, Incorporated, Murray Hill, N.J.

[22] Filed: Apr. 2, 1973

[21] Appl. No.: 347,189

Related U.S. Application Data
[63] Continuation-in-part of Ser. No. 220,448, Jan. 24, 1972, abandoned.

[52] U.S. Cl. ............... 331/94.5, 252/301.4, 330/4.3
[51] Int. Cl. ............................................. H01s 3/16
[58] Field of Search ................ 331/94.5; 252/301.4; 330/4.3

[56] References Cited
OTHER PUBLICATIONS
Danielmeyer et al., IEEE Journal of Quantum Electronics, Vol. QE8, No. 10, October, 1972, pp. 805–808.
Jaulmes, Comptes Rendus de l'Academie de Science de Paris, Series C, March 10, 1969, pp. 935 et seq.

*Primary Examiner*—Ronald L. Wibert
*Assistant Examiner*—R. J. Webster
*Attorney, Agent, or Firm*—Wilford L. Wisner

[57] ABSTRACT

There are disclosed various embodiments of a laser in which the dielectric active medium is a rare earth pentaphosphate, for example, neodymium pentaphosphate. The neodymium pentaphosphate laser uses a crystal that is smaller than would be physically possible in prior art neodymium lasers. Another laser of this type employs a mixed crystal of neodymium pentaphosphate and lanthanum pentaphosphate and has the unusual property that no resonator is needed other than its naturally grown end surfaces. Both pulsed and continuous-wave lasers of this type have been operated. The crystals useful in the new lasers are practically insoluble in the more common solvents, are typically transparent from the ultraviolet into the far infrared except for the metal's absorption bands and have higher fluorescence efficiencies and narrower linewidths than would be expected for materials with such a high concentration of fluorescent ions.

10 Claims, 4 Drawing Figures

FIG. I

LASER EMPLOYING A METALLIC PENTAPHOSPHATE

CROSS REFERENCE TO RELATED APPLICATION

This application is a continuation-in-part of our co-pending U.S. Pat. application, Ser. No. 220,448, filed Jan. 24, 1972, now abandoned, entitled "Compositions of Matter Consisting of Metallic Hyperphosphates," and assigned to the assignee hereof.

BACKGROUND OF THE INVENTION

This invention relates to optically pumped solid state lasers and fluorescent devices employing dielectric active media.

Prior art dielectric crystal lasers have typically employed active ions, such as neodymium, that are introduced into a host material as doping impurities. When a fluorescent crystal or laser crystal is made in this way, stringent limits must be observed on concentrations of active ions if sufficient light emission is to be obtained. For example, in a Nd:YAG laser crystal, the neodymium concentration should be limited to about $1.4 \times 10^{20}$ per cubic centimeter, which concentration corresponds to a 1 percent replacement of the yttrium in $Y_3Al_5O_{12}$. Higher concentrations lead to fluorescence quenching through exchange interactions between neodymium ions, which shortens the fluorescence lifetime. The exchange interactions and another phenomenon called cross-relaxation quenching cause the fluorescent efficiency of the material to decrease so that any advantage of higher doping concentrations is nullified. Similarly, ions desirable for excitation transfer to an active ion, such as $Cr^{3+}$ transferring energy to $Nd^{3+}$ in YAG, are limited to about $5 \times 10^{19}$ per cubic centimeter. Higher concentrations decrease the heat conductivity of the host crystal because chromium, as well as neodymium, is an impurity for the host lattice. The decrease in heat conductivity leads to overheating of the crystal; and a decrease of optical gain results, so that any advantage of higher doping concentrations is nullified. Unfortunately, $Cr^{3+}$ apparently must be within 10 Angstrom separation of $Nd^{3+}$ to transfer energy efficiently thereto. Such a spacing would appear to be achievable only at high ionic concentrations.

It became clear from these facts that a significant improvement could probably not be expected from a search for another host. Rather, we decided to depart from the concept of a doped crystal and to look instead for new materials in which the active ions are chemically integral parts of the compound instead of statistically distributed impurities.

One of the primary motivations for trying to increase the concentration of active ions in the dielectric medium of an optically pumped laser is to make the laser more compact and to make it more compatible with the emerging technology of integrated optical circuits.

SUMMARY OF THE INVENTION

Our invention is based on our discovery of efficient fluorescence and laser action in dielectric crystals that are smaller than the smallest feasible dielectric crystals in prior art lasers.

It is one aspect of our invention that we have found rare earth pentaphosphate crystals to be particularly useful for the production of fluorescence and the generation of laser oscillations. Neodymium pentaphosphate ($NdP_5O_{14}$) is typical of such pentaphosphates. A specific laser employing a neodymium pentaphosphate crystal proved to have a smaller active medium than any prior art laser employing a dielectric medium.

It is another aspect to our invention that certain rare earth pentaphosphates used in the laser produce laser oscillations without any optical resonator other than the naturally grown end surfaces of the crystal. We have obtained both pulsed and continuous-wave laser action in such a laser using a mixed crystal of neodymium lanthanum pentaphosphate ($Nd_zLa_{1-z}P_5O_{14}$, where $0 < z > 1$ is the atomic fraction of the rare earth elements that is neodymium).

More broadly, we employ particular compositions of matter consisting at least in major part of rare earth elements. A metallic pentaphosphate including trivalent metallic elements of which the predominant molar fraction are rare earth elements is particularly desirable in the devices of the present invention. A trivalent metallic element has a +3 valence.

The typical formula is $X_zM_{1-z}P_5O_{14}$, where X is a rare earth element, M is an element selected from the group consisting of rare earth elements and yttrium.

We also have discovered that some metals that are normally poisons for fluorescence, and which have never been known to behave in an optically lossless manner in a passive crystal, behave in a lossless manner when present in polyphosphate crystals. Iron is an example of such metals. The significance of this discovery is that we do not have to worry about, for instance, iron impurities in our laser crystals.

It has also been discovered that our rare earth pentaphosphate crystals can produce very narrow band, highly efficient fluorescence even when the concentration of the active ion is about two orders of magnitude greater than is feasible in previous dielectric laser crystals. The phosphate radicals apparently provide superior shielding against exchange interactions between the active ions. Exchange interactions are interactions that increase the quantum mechanical uncertainty of the energy levels of the ions and thereby broaden the radiative linewidth. Also, cross-relaxation quenching appears to be essentially absent in neodymium pentaphosphate and neodymium-lanthanum pentaphosphate. Cross-relaxation quenching is a type of fluorescence quenching in which an ion excited to the upper laser level and another nearby ion, usually of like type, have respective pairs of levels that have like separations, but are otherwise unlike, so that energy is funneled from the upper laser level of the originally excited ion to an excited level of the other ion, from which an energy-wasting decay occurs.

It is a further specific feature of the processing aspects of our invention that either a gold crucible be used or that some other generally nonreactive container in a non-reactive atmosphere be used. Further, our new process typically uses a phosphoric acid and metallic salts as initial reactants. The phosphoric acid eventually becomes a polyphosphoric acid in the reaction. We found that a polyphosphoric acid dissolved most containers for the reaction, the outstanding exception being a gold crucible. Other materials for the container, other than gold, are possibly heavy metals, or graphite used in oxygen-free atmospheres.

DESCRIPTION OF ILLUSTRATIVE EXAMPLES

Preparation of Crystals

In one of our initial experiments, in order to investigate ways to avoid the deleterious infrared absorptions associated with hydrogen atoms, we used heavy phosphoric acid, $D_3PO_4$. The acid was prepared from $D_2O$ and $P_2O_5$. A mixture of $Cr_2O_3$ and $Nd_2O_3$ in the molar ratio of 3:1 was in a gold crucible under an argon atmosphere to keep our hydrogen; excess $D_2O$ boiled off, and the resulting heavy polyphosphoric acid in the form $DO(DPO_3)_nD$ dissolved the metallic oxides. In contrast to the normal solution including hydrogen, the deuterated solution fluoresced at room temperature, even if diluted with some $D_2O$. After further gradual heating to 1,000° C in an oven under an argon atmosphere, a strongly fluorescing group of solid bodies was obtained. Later studies indicated that they contained no neuterium (D).

In one of our succeeding experiments, as a matter of economy, normal phosphoric acid, $H_3PO_4$, was used. A powder of neodymium oxide ($Nd_2O_3$) was added. Upon heating to 400° C in a gold crucible under an argon atmosphere, excess $H_2O$ boiled off and the resulting metaphosphoric acid dissolved the neodymium oxide. The solution would not fluoresce. The solution was then further gradually heated to 1,000° C in an oven under an argon atmosphere.

The neodymium-containing single crystals which resulted from the further heating fluoresced as well as those that had been made with the deuterated acid. The conclusion that the single crystals of both examples contained neither D nor H was confirmed later; and the growth of single crystals became much easier.

The process of this example may be given in more detail as follows. About $10^{-3}$ mols of anhydrous $Nd_2O_3$ powder are suspended in 1 cm³ $H_2O$ using a gold crucible. When 3 cm³ concentrated $H_3PO_4$ are added, the $Nd_2O_3$ dissolves. The crucible is gradually heated to 400° C. This can be done with a Bunsen burner if the crucible is put on a stainless steel sheet with a glass funnel on top for protection from foreign matter. At first, the excess water boils off. When the solution goes through the pyrophosphoric phase ($H_4P_2O_7$) it becomes milky, but in the metaphosphoric phase, it clears up again. Then, probably, the reaction $$2HO(HPO_3)_nH + Nd_2O_3 \rightarrow Nd_2O_3(P_2O_5)_n + (n + 2)H_2O \uparrow \quad (1)$$

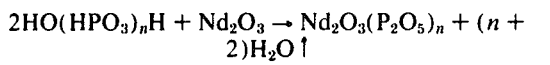

occurs. After some time little crystals form at the surface which grow if washed to the bottom as the metaphosphoric acid evaporates very slowly. The crystals can be used as seeds for growing larger ones.

This method may be called growth from solution. One should keep in mind, however, that the metaphosphoric acid is not just a solvent but an essential component of the reaction (Equation (1)). This probably explains the extremely low solubility in metaphosphoric acid of all pentaphosphates made so far with trivalent metals.

In a modification of the above, we speeded crystal growth by pumping out the volatile products resulting from heating and condensed them in a cold trap before they could reach the pump. We found that most of the volatile products when condensed include forms of phosphoric acid which would be very corrosive to the pump. Therefore the cold trap is essential to pump life.

We also found that feeding finely powdered neodymium oxide into the hot solution kept it saturated while the neodymium ultraphosphate crystals grew. Unless the neodymium oxide particles were kept small, undissolved lumps would cause impurities which deposited on the resulting crystal faces.

LASER EXAMPLE I

In contrast to prior art neodymium ion: yttrium aluminum garnet active crystals for use in lasers, a neodymium pentaphosphate crystal contains the $Nd^{3+}$ ion as an essential part of the elementary crystalline cell. It is this basic fact which caused us to investigate such a crystal for use in the laser.

Our experimental setup is shown in FIG. 1. A flashlamp-pumped Rhodamine 6G dye laser 10 was employed to pump a crystal 24 of neodymium pentaphosphate which was included in a separate resonator including reflectors 25 and 26, the reflector 25 being partially transmissive to emit part of the neodymium laser radiation as an output to a utilization apparatus 30 or, as in our early experiments, to a spectrometer 30. The dye laser 10 included principal end reflectors 12 and 13 which had 3-meter concave radii of curvature (not shown) and transmissivities of 25 percent and 15 percent respectively. The dye laser 10 also included the beam-expanding telescope 16 and the wavelength-selective grating 17 beyond the 25 percent transmissive reflector 12. The power of telescope 16 was about 10 times.

The pumping dye laser pulses had a duration of about 0.5 microseconds, a center wavelength of about 0.58 micrometers and about 0.05 nanometers spectral bandwidth. A principal absorption band of our pentaphosphate crystals containing a major constituent of neodymium is at about 0.58 micrometers. In a typical experiment, the pumping laser emission contained several transverse order modes and had a peak power of about 400 watts, which corresponds to an energy of about 200 microJoules per pulse. The threshold energy for laser oscillation was 40 microJoules of pump light impinging on the laser crystal.

The output pumping power transmitted through reflector 13 was redirected by oblique-incidence reflectors 20 and 21 through the lens 22 into the neodymium laser resonator. The neodymium pentaphosphate crystal 24 was a platelet of approximately 35 micrometers thickness. The platelet absorbed about 65 percent of the pump light and showed no sign of damage up to $10^8$ watts per square centimeter, the highest power density we could achieve. The surfaces of crystal 24 traversed by both the pumping laser beam and by the stimulated laser beam were as naturally grown and had not been polished. The resonator of the laser 23 was a nearly concentric resonator with reflector 25 having a radius of curvature of 3.75 centimeters and a transmissivity of 1.5 percent at 1.05 micrometers and a transmissivity of 60 percent at 0.58 micrometers, the pumping wavelength. Typically, reflector 26 was identical to reflector 25 and was separated therefrom by a distance of 7.35 ± 0.05 centimeters.

For the fundamental mode of the neodymium pentaphosphate laser 23, the calculated waist radius $w_o$ of the stimulated laser beam in the crystal 24 is in the range between 38 and 46 micrometers. The lens 22, with a focal length of 3.25 centimeters, focused the pump light onto an area slightly larger than this spot size. The output stimulated radiation from laser 23 was collected by a lens 27 and focused into a double grating spectrometer 30 from which the pump light had been blocked by a commercially available infrared-transmissive filter 28.

In an actual application of our invention, apparatus 30 would be typical apparatus for using the laser radiation, for example, an integrated optical circuit such as would be useful in a data processing system or a telephone system.

Figure 2:
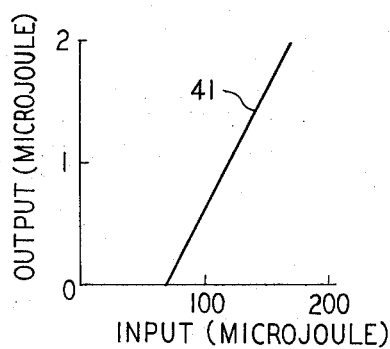

In spite of the neodymium ion concentration, which was about 30 times higher than in prior art neodymium-:yttrium aluminum garnet laser crystals, the absorption and emission spectra for crystal 24 look similar to those for the prior art neodymium laser crystals, although the linewidths of the individual transitions in the present laser are somewhat wider than for 1 percent-doped neodymium:yttrium aluminum garnet lasers. The fluorescence lifetime is about 66 microseconds compared to 230 microseconds for the prior art laser. In FIG. 2 the output energy per pulse of the NdUP laser emission is plotted versus the input energy per pulse pump incident on the NdUP resonator. The linear relationship between input and output demonstrates that we were well above threshold. With the spectrometer adjusted to accept a bandwidth of 10 nanometers, the received signal when crystal 24 was pumped above threshold was more than $10^5$ times larger than when it was pumped below threshold. This ratio indicates the existence of laser oscillation in the former case. Taking into account pump reflections (40 percent), crystal absorption (65 percent), and the fact that we have equal outputs through the two mirrors, we calculate a slope quantum efficiency of 18 percent. For comparison we also placed a 1 percent doped YAG:Nd slab of 6 millimeter thickness into the same resonator. Here the pump light was completely absorbed. The threshold was 4 microJoule of pump light impinging on the YAG:Nd crystal. Consequently to reach threshold, 6.5 times more energy had to be absorbed in the neodymium pentaphosphate crystal 24 than in the YAG:Nd. The threshold for laser action is proportional to the spontaneous emission bandwidth and, therefore, is higher for neodymium pentaphosphate than for YAG:Nd. The ratio of the bandwidths is difficult to evaluate because several lines overlap at room temperature. We estimate the bandwidth ratio to be ~3. The difference in the relaxation times is irrelevant for the short pump pulses used in the present experiment. However, the etalon effect of the platelet (16 nanometer mode spacing) and differences in the optical quality between the unpolished neodymium pentaphosphate surfaces and the polished YAG:Nd surfaces may account for the remaining factor of 2.2 contributing to the threshold ratio.

Figure 3A:
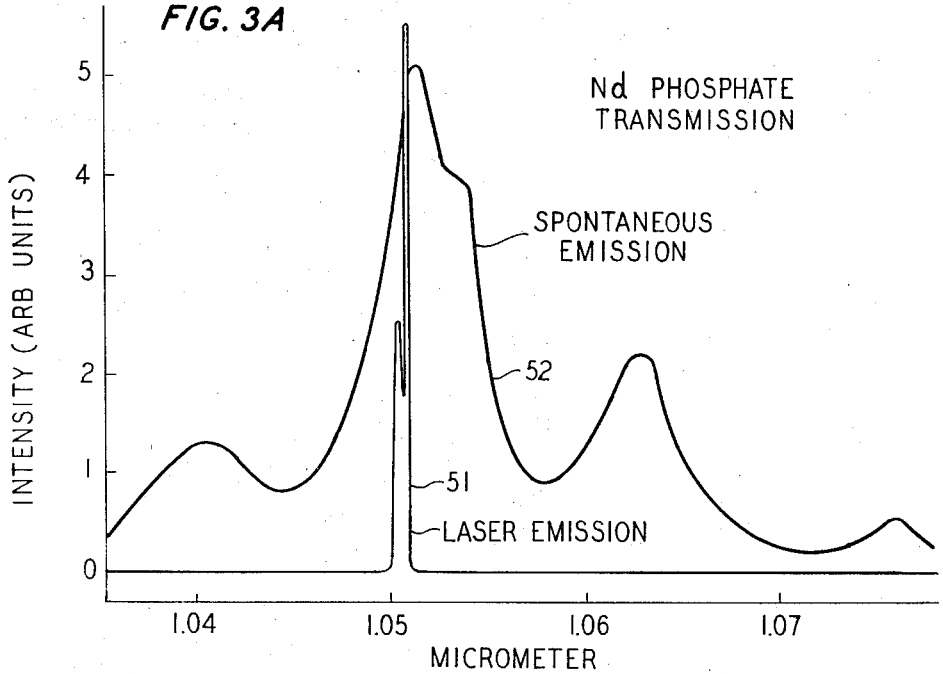
Figure 3B:
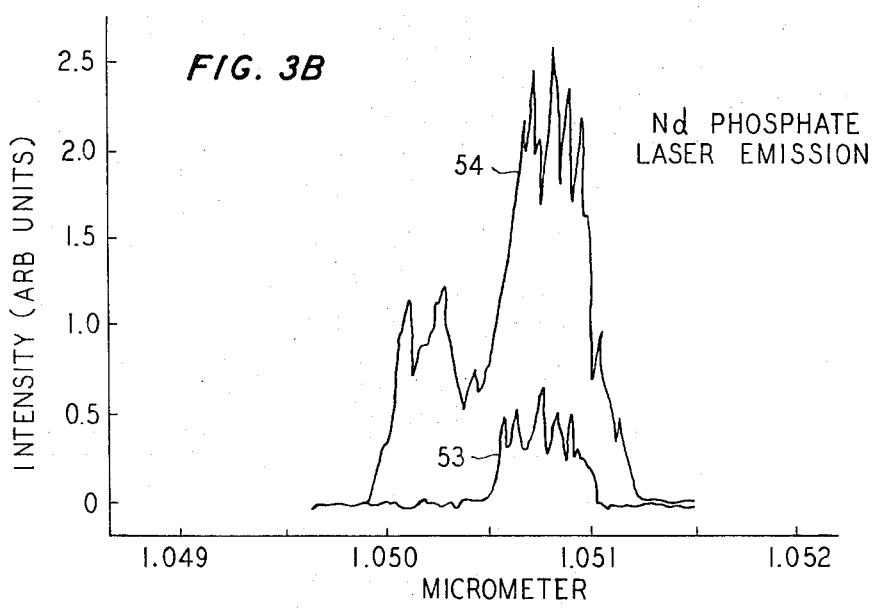

FIG. 3a shows the room temperature spontaneous fluorescence spectrum in curve 52 of neodymium pentaphosphate and, with a different intensity scale, the spectrum in curve 51 of the laser emission. Both plots show intensity versus wavelength. The neodymium pentaphosphate laser emission is unpolarized as is also the spontaneous fluorescence. FIG. 3b shows the laser emission spectrum expanded. Curve 53 was observed for pumping 1.2 times threshold. In curve 54, which corresponds to pumping 2.5 times threshold, a second line appears. This second line cannot be explained by the mode separation of the resonator or the etalon effect of the platelet. According to the complete spectral analysis of neodymium pentaphosphate the main laser line corresponds to the transition from the lower $^4F_{3/2}$ level to the lowest $^4I_{11/2}$ level, and the shorter wavelength companion corresponds to the transition from the upper $^4F_{3/2}$ level to the fourth $^4I_{11/2}$ level. At room temperature these transitions are separated by only 0.7 nanometers, i.e., they overlap nearly completely.

Even though, as discussed above, the laser threshold was reached with about 6½ times more pump energy for laser 23 than for the neodymium:yttrium aluminum garnet platelet that was tested for purposes of comparison, a given amount of pump light can be absorbed by a neodymium pentaphosphate plate only one-thirtieth as thick as the 1 percent neodymium:yttrium aluminum garnet platelet that would absorb the same pump light. A 1 millimeter thick platelet of Nd:YAG is about the thinnest that could be used in a laser. Crystal 24 is clearly much smaller.

The advantages of concentration of the active ion can be even more readily utilized if the arrangement of FIG. 1 were rearranged to pump the laser medium from the side, that is, to pump it transversely. For such transverse pumping, the higher absorption of neodymium pentaphosphate should provide the desired advantage of a lower laser threshold. We expect for the present quality of crystals a threshold about five times lower for neodymium pentaphosphate than for 1 percent neodymium:yttrium aluminum garnet in pulsed operation with transverse pumping.

Therefore, neodymium pentaphosphate is a promising material for miniaturized neodymium laser, especially any that are transversely pumped and especially any that are pumped by gallium arsenide lasers or luminescent diodes in the 0.8 micrometers or 0.9 micrometers absorption bands of the neodymium pentaphosphate.

The embodiment of FIG. 1 may be further modified to eliminate the resonator comprising reflectors 25 and 26 by the use of a mixed crystal of rare earth pentaphosphates.

Specifically, we have obtained laser action in a 1 millimeter × 1 millimeter × 60 micrometer thick mixed crystal of neodymium pentaphosphate and lanthanum pentaphosphate in which the naturally grown parallel end surfaces orthogonal to the short dimension of the crystal were transversed by the pumping beam and formed the only optical resonator for the stimulated laser beam. While the first experimental embodiment of the mixed crystal laser was flashlamp-pumped and was therefore pulsed, another embodiment employing a mixed crystal with a longest dimension of 2 millimeters between the parallel surfaces produced continuous-wave lasing action when pumped by a continuous-wave argon ion laser at 5,145 A (0.5145 micrometer). This laser oscillated in a continuous-wave manner despite the small absorption at this pump wavelength. A better pump wavelength would be about 5,800 A (0.58 micrometer).

It should be clear that analogous laser action should be obtained in many other rare earth pentaphosphates or mixed crystals thereof. For this purpose, yttrium should be considered similar to a rare earth, since it readily forms mixed crystals with the rare earths. Yttrium pentaphosphate is known. Some of the rare earths are not typically used as laser ions and are more useful as diluents. The preferred diluents in mixed-crystal rare earth pentaphosphates are lanthanum (La), gadolinium (Gd), yttrium (Y), and lutetium (Lu).

Further alternatives for the growth of the crystals may be described as follows:

Some inferior means of speeding crystal growth were tried and are also feasible for some purposes. For example, adding lithium carbonate ($Li_2CO_3$) to the hot solution depletes the metaphosphoric acid. Carbon dioxide gas is liberated; and a lithium phosphate is formed. The lithium phosphate is then separated from the neodymium pentaphosphate by cooking the mixture in normal phosphoric acid. The lithium phosphate and neodymium pentaphosphate crystals can also be mechanically separated because of their differing physical appearances. Neodymium pentaphosphate has a pinkish appearance.

A neodymium pentaphosphate laser may be pumped at 0.81 micrometer by GaAlAs light-emitting diodes or at 0.89 micrometer by GaAs light-emitting diodes, both of known type. In either case, the light-emitting diode or diodes would provide an elongated region of pumping light about one millimeter long and 30–100 micrometers wide illuminating the laser crystal from the side between its resonator reflectors and penetrating perhaps about 100 micrometers into the crystals before most of the pump light is absorbed. Significant improvements in pumping power threshold as compared to prior art neodymium ion lasers should result.

We claim:

1. A laser of the type comprising a dielectric active medium, means for optically pumping said active medium to produce a population inversion therein between levels of a radiative transition, and means including said medium for resonating the radiation of said transition to yield the stimulated emission of coherent radiation therefrom including means for extracting a portion of said coherent radiation for utilization, said laser being characterized in that said active medium consists essentially of $X_zM_{1-z}(P_5O_{14})$, in which X the emitting ion is neodymium and M is an element selected from the group consisting of rare earth elements and yttrium.

2. A laser according to claim 1 in which the active medium consists essentially of a single crystal of neodymium pentaphosphate ($NdP_5O_{14}$).

3. A laser according to claim 1 in which the active medium consists essentially of a single-crystal mixture of neodymium and lanthanum pentaphosphates ($Nd_zLa_{1-z}P_5O_{14}$).

4. A laser according to claim 2 in which the pumping means comprises a tunable dye laser, said dye laser being tuned to operate at 0.58 micrometers, the wavelength of one of the strong absorption bands of said neodymium pentaphosphate.

5. A laser according to claim 4 in which the resonating means comprises a pair of reflectors disposed about the single crystal of neodymium pentaphosphate to define a resonator axis along which the coherent radiation propagates and the tunable dye laser includes a separate optical resonator having an axis along which the dye laser radiation propagates, said resonator being coupled to said resonating means for end pumping of the crystal, so that the latter radiation propagates along said resonator axis of said pair of reflectors.

6. A laser according to claim 4 in which the resonating means has a resonator axis along which the coherent radiation is repeatedly passed through the neodymium phosphate crystal, said crystal having a dimension along said axis that is substantially smaller than any comparable dimension in any prior operable laser of a solid state active medium therein containing neodymium active ions.

7. A laser according to claim 1 in which the resonating means has a resonator axis along which the coherent radiation is repeatedly passed through the active medium, said active medium having a dimension along said axis that is substantially smaller than any comparable dimension in any prior operable laser of a solid state active medium therein containing active ions of the rare earth element.

8. A laser according to claim 1 in which the active medium consists essentially of a single-crystal mixture of neodymium and lanthanum pentaphosphates in nearly equal proportions approximating the formula $Nd_{0.5}La_{0.5}P_5O_{14}$, the resonating means comprising substantially parallel surfaces as naturally grown of said single-crystal mixture, the pumping means comprising a tunable dye laser coupled to the crystal to direct its output dye laser beam essentially normal to said surfaces and tuned to a wavelength of 0.58 micrometers.

9. A laser according to claim 8 in which the single-crystal mixture has a smaller dimension between said surfaces than any comparable dimension in any prior operable laser of a solid state active medium therein containing neodymium active ions.

10. A laser according to claim 9 in the single-crystal mixture has a dimension between said surfaces substantially less than 1 millimeter.

* * * * *